United States Patent [19]

Radliff et al.

[11] Patent Number: 5,566,268
[45] Date of Patent: Oct. 15, 1996

[54] STRAIN RELIEVING HOLDER FOR OPTICAL FIBER CABLE

[75] Inventors: David R. Radliff; Scott A. Keener, both of Harrisburg, Pa.

[73] Assignee: The Whitaker Corporation, Wilmington, Del.

[21] Appl. No.: 453,157

[22] Filed: May 30, 1995

[51] Int. Cl.⁶ ..................................................... G02B 6/00
[52] U.S. Cl. ........................... 385/137; 385/114; 385/136
[58] Field of Search ..................................... 385/114, 136, 385/137

[56] References Cited

U.S. PATENT DOCUMENTS

| | | | |
|---|---|---|---|
| 3,768,146 | 10/1973 | Braun et al. | 385/99 X |
| 4,627,686 | 12/1986 | Szentesi | 350/96.20 |
| 4,687,289 | 8/1987 | DeSanti | 350/96.20 |
| 4,702,551 | 10/1987 | Coulombe | 350/96.20 |
| 4,793,681 | 12/1988 | Barlow et al. | 385/135 |
| 4,840,449 | 6/1989 | Gnandeharizadeh | 350/96.20 |
| 4,842,362 | 6/1989 | Anderton | 385/135 |
| 4,854,661 | 8/1989 | Cooper et al. | 385/99 |
| 4,911,521 | 3/1990 | Ryuto et al. | 350/96.20 |
| 5,046,811 | 9/1991 | Jung et al. | 385/15 |
| 5,069,523 | 12/1991 | Finzel et al. | 385/135 |
| 5,071,211 | 12/1991 | Debortoli et al. | 385/76 |
| 5,208,893 | 5/1993 | McCall et al. | 385/135 |
| 5,222,184 | 6/1993 | Foss | 385/135 |
| 5,278,933 | 1/1994 | Hunsinger et al. | 385/135 |
| 5,375,185 | 12/1994 | Hermsen et al. | 385/135 |
| 5,416,882 | 5/1995 | Hakoun et al. | 385/136 |
| 5,420,956 | 5/1995 | Grugel et al. | 385/135 |

OTHER PUBLICATIONS

*AMP Instruction Sheet 408–9490*, "AMP Organizer Holder Kits and Trays", five pp.; Mar. 1993; AMP Incorporated, Harrisburg, PA.
*DSM Brochure*, "Sarlink 3000 Thermoplastic Elastomers", three pp. Nov., 1994; DSM Thermoplastic Elastomers, Inc., Leominster, MA.
*AMP Catalog 82188*, "AMP Fiber Optic Products", p. 147; Feb., 1993; AMP Incorporated, Harrisburg, PA.
*Bejed Drawing*, "BJ–1742C–005 12 Fiber Universal Splice Unit", Feb., 1994; BEJED Communication Products, Portland, OR.

*Primary Examiner*—Rodney B. Bovernick
*Assistant Examiner*—Robert E. Wise
*Attorney, Agent, or Firm*—Anton P. Ness

[57] ABSTRACT

A holder (30) for jacketed fiber optic cable (26) or ribbon cable (28) having channels (32) extending along a top surface (34), with constrictions (42) to hold jacketed fiber optic cable (26) therein upon insertion with nondeforming strain relief. Protrusions (40) between the channels (32) include narrow slots (44) thereinto to hold ribbon cable (28) therein with nondeforming strain relief.

8 Claims, 3 Drawing Sheets

STRAIN RELIEVING HOLDER FOR OPTICAL FIBER CABLE

FIELD OF THE INVENTION

The present invention relates to the field of optical fiber interconnection and more particularly to strain relief members for optical fiber cable.

BACKGROUND OF THE INVENTION

In multiple fiber interconnection arrangements, a plurality of pairs of associated optical fibers are to be interconnected and such interconnections must thereafter be held securely and carefully, usually in an organizer tray or cassette within a larger enclosure or cabinet, and usually in an array of such trays or cassettes. Such trays must also hold generous portions of the fibers adjacent the interconnections, or splices, to permit splice repair without requiring cable replacement. Preferably the trays or cassettes also provide for securing jacketed portions of the cables containing one or more of the optical fibers, at ends of the trays. The splice connections comprise fusion of the ends or end lengths of the associated optical fibers, or adhesive bonding, or precision clamping, and the thus-fused fiber ends are preferably maintained within a protective sleeve or adapter to maintain the precision alignment of the fibers and provide a level of physical protection and strain relief to the coupling.

One conventional method for securing optical fiber cables at ends of organizer trays has been to utilize cable ties that extend through holes in the bottom wall of a tray at each end and are snapped overtop of respective jacketed cable portions, or to utilize cable clamps in similar fashion. Within the tray the optical fibers are broken out from the jacket for ends of the optical fibers to be spliced or coupled, with such splice connections to be maintained within grooved holders centrally located between the tray ends or cable exits. Examples of splice trays or organizers or cassettes are disclosed in U.S. Pat. Nos. 4,627,686; 4,687,289; 4,702,551; 4,840,449; 5,069,523; and 5,222,184.

It is desired to provide a strain relief member at cable exits from a tray or organizer or cassette, that provides sufficient clamping of jacketed portions of fiber optic cables to relieve strain on the splice connection or coupling, without compressing or otherwise deforming the optical fiber therewithin.

It is also desired to provide a strain relief member for clamping of multifiber fiber optic ribbon cable to define strain relief therefor.

SUMMARY OF THE INVENTION

The present invention comprises a member of resilient material when strain relief of either a jacketed fiber optic cable or ribbon cable is desired. The strain relief member is placeable at either end of an organizer or tray or at the cable exit of a cassette and may be affixed to the bottom tray wall such as by adhesive or double sided tape. The strain relief member includes an array of generally parallel channels or grooves formed into and along the top surface, separated by elongate protrusions, and having constrictions along the entrances thereinto. Slots of only incremental width extend from the top surface into and along each protrusion at its center and into which may be placed ribbon cable and that are slightly compressed thereby after insertion. The channels are dimensioned to receive relatively large diameter (e.g., 3 mm) jacketed cable, with the constrictions being less wide than such cable to retain the cable in the channels after placement; the slots provide for temporary widening of the constrictions during placement of the jacketed cables into the channels.

It is an objective of the invention to provide a strain relief member that engages the fiber optic members without deforming them but establishes sufficient clamping to hold them in position and generate strain relief to protect the splice couplings thereof.

It is another objective to provide a strain relief member that provides such nondeforming strain relief clamping of fiber optic ribbon cable.

It is further an objective to provide a strain relief member that is adapted to receive either conventional fiber optic cable or ribbon cable as desired.

It is still further an objective to provide a strain relief member that facilitates quick and simple initial placement of fiber optic cable or ribbon cable thereinto.

It is yet another objective to provide such a strain relief member that easily enables removal and replacement of previously held fiber optic cable or ribbon cable.

An additional advantage of the strain relief member of the present invention is that the members may be extruded.

An embodiment of the present invention will now be described by way of example with reference to the accompanying drawings.

DETAILED DESCRIPTION OF THE PREFERRED EMBODIMENT

Figure 1:
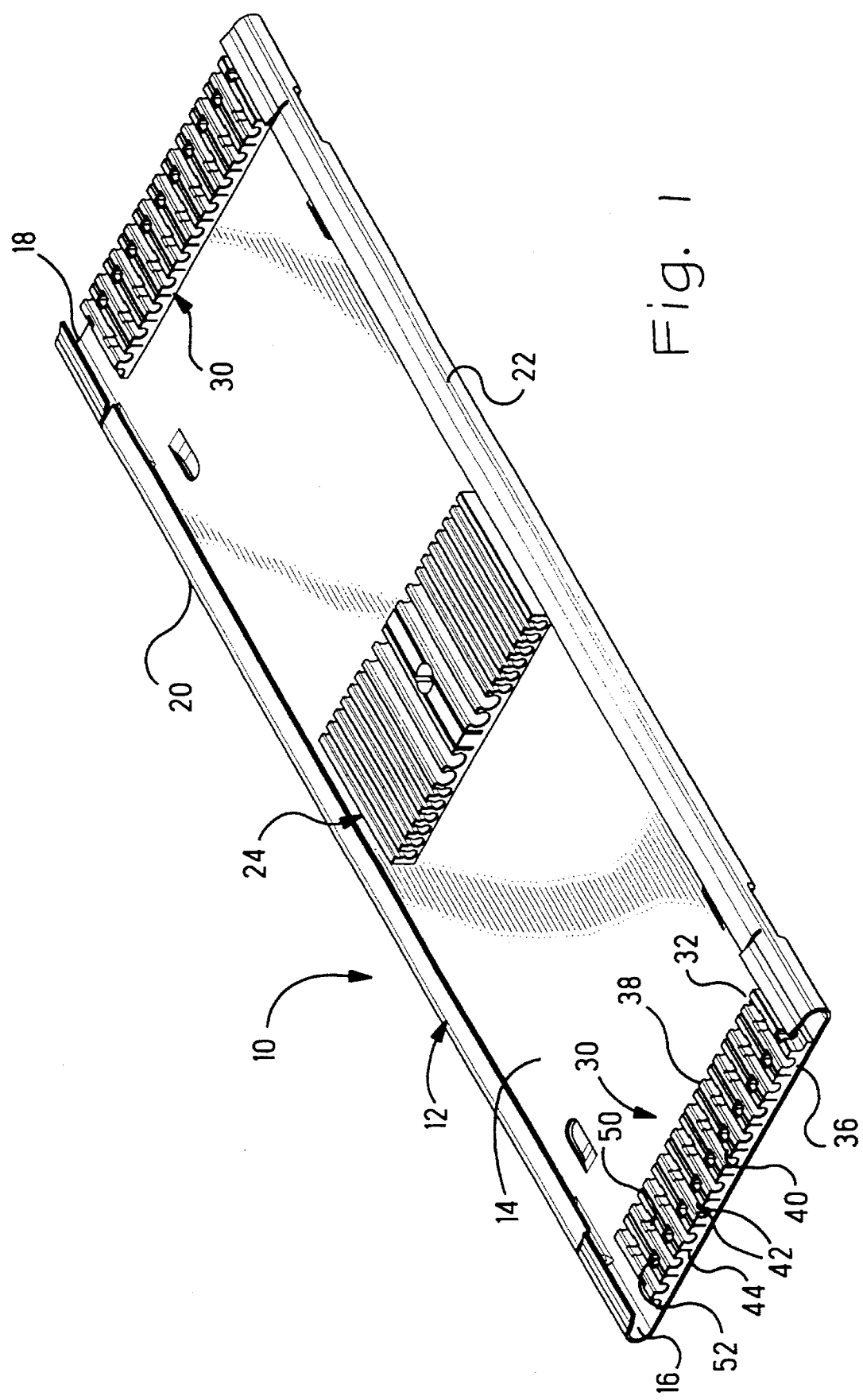
FIG. 1 is an isometric view of a splice tray having cable strain relief members of the present invention at ends thereof and a splice holder centrally disposed therebetween.

A splice tray or organizer 10 includes a tray body 12 having a bottom wall 14, opposed ends 16,18 and opposed side walls 20,22, as well as a preferably an optionally transparent cover member (not shown) that is securable to tray body 12. A splice holder 24 is affixed to bottom wall 14 centrally positioned between ends 16,18 within which splice connections of pairs of associated optical fibers of single-fiber cables, or splice connections of arrays of fibers of associated ribbon cables may be positioned. Each splice holder may be as disclosed in U.S. patent application Ser. No. 08/453,739 filed May 30, 1995 (concurrently herewith), or as disclosed in U.S. patent application Ser. No. 08/453,730 filed May 30, 1995 (concurrently herewith), both assigned to the assignee hereof. Tray 10 provides substantial fiber-holding space between the ends for generous loops of discrete fibers after being broken out from jacketed cables and ribbon cable to be disposed therein that are preferably covered by the protective lid or cover member placed thereover and affixed to tray body 12.

Figure 2:
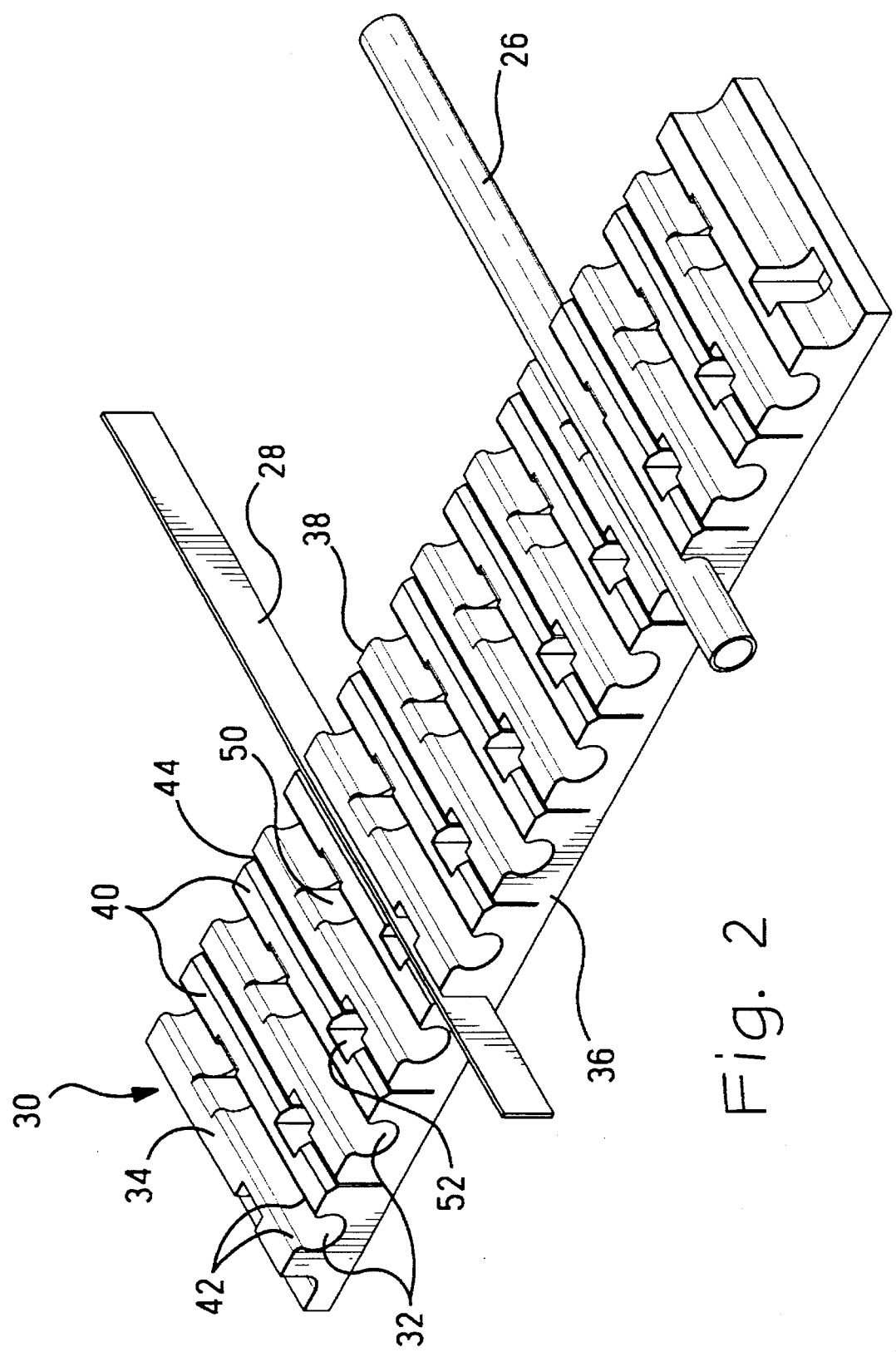
FIG. 2 is an isometric view of the splice holder of FIG. 1, with a representative single-fiber jacketed cable and a representative ribbon cable held therein.
Figure 5:
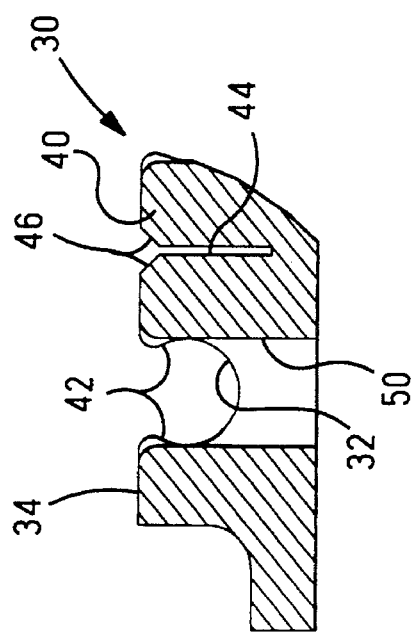
FIG. 5 is an enlarged cross-section view of FIG. 3 taken along lines 5—5 thereof and showing a ribbon-receiving slot and a cable-receiving channel at a cable tie aperture.
Figure 6:
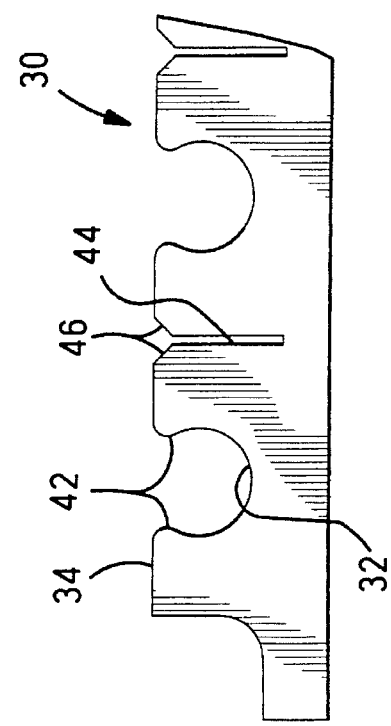
FIG. 6 is an enlarged view of an end portion of FIG. 4.
Figure 3:
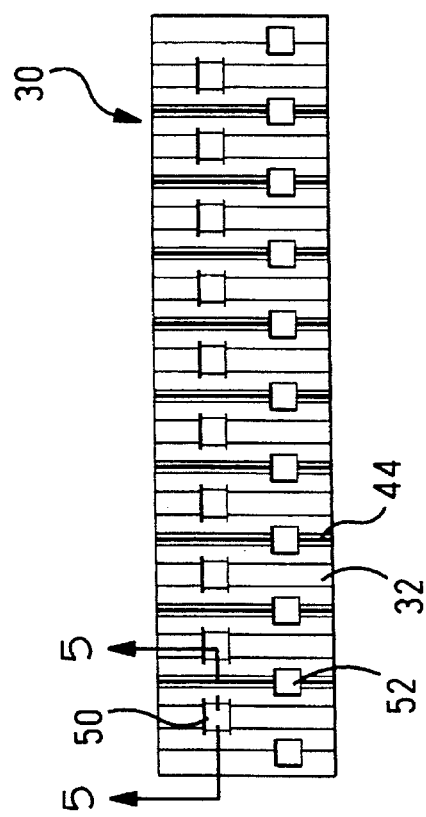
FIGS. 3 and 4 are plan and elevation views of the splice holder.
Figure 4:
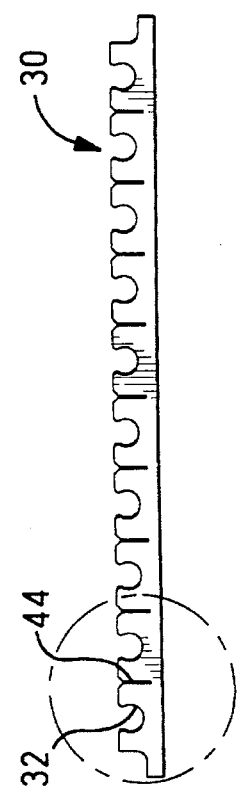

Cable strain relief holders 30 are affixed to tray body 12 at respective ends 16,18, such as by use of adhesive or optionally by fasteners. Strain relief holder 30 includes a plurality of generally parallel elongate channels 32 formed into and along top surface 34 extending between first and second ends 36,38, with elongate protrusions 40 positioned between adjacent channels 32. Channels 32 are dimensioned to receive thereinto, if desired, jacketed portions of fiber optic cables 26 (as shown in FIG. 2) that have for example diameters of 3 mm, and each is undercut to form retention ledges 42 near top surface 34 defining therebetween a constriction less wide than the cable that will hold a jacketed cable 26 in position once inserted.

Each protrusion 40 preferably has a narrow slot 44 formed thereinto from top surface 34, with narrow slot 44 being dimensioned to approximately equal the thickness of a ribbon cable to receive a ribbon cable 28 thereinto. Narrow slot 44 is also of appropriate width to receive thereinto a buffered portion of a single fiber after being broken out from the jacket of a cable 26, if desired. Preferably the entrance to each slot 44 includes chamfers 46 defining a lead-in facilitating insertion of a ribbon cable thereinto. Slots 44 also can assist in insertion of jacketed cables 26 into channels 32 by allowing upper portions of protrusions 40 to be flexed outwardly when a cable 26 is urged into the slightly narrower entrance to a channel 32 above retention ledges 42.

Strain relief holder 30 may also be provided with cable tie apertures 50,52 that are formed to be aligned with corresponding apertures (not shown) in the bottom wall 14 of splice tray 10, permitting mounting of conventional cable ties to the splice tray to supplement the strain relief characteristics of the strain relief holder, if desired. Cable tie apertures 50 are shown intersecting each channel 32 and are to be used when holder 30 is to be used with ribbon cable that utilizes slots 44, while cable tie apertures 52 are shown intersecting slots 44 that are to be used when holder 30 is to be used with jacketed single fiber cable.

It can be seen that strain relief holders 30 may be utilized within the splice tray if desired, positioned on both sides of a splice coupler site to hold adjacent portions of buffered fiber or ribbon cable. Similarly, strain relief holders may be utilized independently of a splice tray per se, for similar purposes, with the bottom surface of the bottom member affixed to a surface such as by adhesive, double sided tape and peelable transfer paper, or other fasteners. Strain relief holder 30 may be made for example of a resilient material such as an elastomeric material like, for example, SARLINK polypropylene based elastomer, Part No. 3170 or 3160 or 9760 sold by DSM Thermoplastic Elastomers Inc., Leominster, Mass., and may be extruded rather than individually molded since holder 30 generally has continuous cross-sections therealong, with cable tie apertures 50,52 being formable by simple secondary operations.

The strain relief member of the present invention may be utilized in pairs, one adjacent each side of the splice couplings near the center of a splice tray if desired. The present invention may also be used independently of a splice tray if desired by simply being secured to a selected surface in a desired orientation to receive and hold fiber optic members such as jacketed fiber optic cable, discrete buffered optical fiber or ribbon cable. Variations and modifications may occur to others that are within the spirit of the invention and the scope of the claims.

What is claimed is:

1. A holder for fiber optic members, comprising:

a member of resilient material including an array of channels defined into a top surface thereof extending in parallel between opposed first and second ends, each said channel having a width complementary to a diameter of a jacketed fiber optic cable to receive a length of jacketed cable therealong, and each said channel having an entrance along said top surface and a constriction at said entrance less wide than a diameter of a jacketed fiber optic cable; and said channels being separated by protrusions therebetween, and each said protrusion including a narrow width slot extending thereinto from said top surface with said slot being complementary to a thickness of a fiber optic ribbon cable and a depth sufficient to receive a ribbon cable thereinto and therealong, whereby said channels provide holding sites for jacketed fiber optic cable and said slots provide holding sites for ribbon cable.

2. A holder as set forth in claim 1 wherein said slots include chamfered entrances defining lead-ins facilitating ribbon cable insertion.

3. A holder as set forth in claim 1 wherein said resilient material is elastomeric material.

4. A holder as set forth in claim 3 wherein said elastomeric material is a polypropylene based elastomer.

5. A fiber optic splice tray, comprising:

a tray member having a bottom wall, opposed side walls and opposed ends; and a holder affixed to said bottom wall at each of said opposed ends, each said holder comprising a member of resilient material including an array of channels defined into a top surface thereof extending in parallel between opposed first and second ends, each said channel having a width complementary to a diameter of a jacketed fiber optic cable to receive a length of jacketed cable therealong, and each said channel having an entrance along said top surface and a constriction at said entrance less wide than a diameter of a jacketed fiber optic cable; and said channels being separated by protrusions therebetween, and each said protrusion including a narrow width slot extending thereinto from said top surface with said slot being complementary to a thickness of a fiber optic ribbon cable and a depth sufficient to receive a ribbon cable thereinto and therealong, whereby said channels provide holding sites for jacketed fiber optic cable and said slots provide holding sites for ribbon cable.

6. A fiber optic splice tray as set forth in claim 5 wherein said slots include chamfered entrances defining lead-ins facilitating ribbon cable insertion.

7. A fiber optic splice tray as set forth in claim 5 wherein said resilient material is elastomeric material.

8. A fiber optic splice tray as set forth in claim 7 wherein said elastomeric material is a polypropylene based elastomer.

\* \* \* \* \*